April 18, 1950     O. N. BRYANT     2,504,640
REHEAT TURBINE CONTROL

Filed July 3, 1948     2 Sheets-Sheet 1

INVENTOR
*Ozro N. Bryant*
BY
ATTORNEY

Patented Apr. 18, 1950

2,504,640

UNITED STATES PATENT OFFICE 2,504,640

REHEAT TURBINE CONTROL

Ozro N. Bryant, Prospect Park, Pa., assignor to Westinghouse Electric Corporation, East Pittsburgh, Pa., a corporation of Pennsylvania Application July 3, 1948, Serial No. 36,837

7 Claims. (Cl. 60—73)

The invention relates to a turbine installation in which superheated steam is supplied to a first or high-pressure turbine section and steam discharging from the latter is reheated and then supplied to a second or intermediate-pressure turbine section, and it has for an object to provide for operation of the throttle and the admission or governor valves in the supply connection of the first turbine section and of the interceptor valve in the supply connection of the second turbine section in response to turbine speed.

A further object of the invention is to provide, for an installation of the above character, a governing system consisting, in effect, of two governors, a normal or main one set to govern the turbine installation for normal speed and an auxiliary one set to supersede the first governor at a speed slightly higher than normal to take control of the admission valve to close the latter upon a further small percentage of increase in speed followed, in the event of slight additional increase in speed, by rapid closing of the interceptor valve.

Another object of the invention is to provide for operation of the interceptor valve of a reheat turbine installation both in response to a governor set for a speed higher than normal and to an emergency or autostop governor, the governor having the setting for a speed above normal being capable of opening and closing the interceptor valve, and the emergency or autostop governor operating, in the event of a predetermined overspeed, to close the interceptor valve as well as the throttle valve.

Another object of the invention is to provide a reheat turbine installation with an interceptor valve between the reheater and the section of the turbine supplied thereby together with a governor set for a speed above normal and effective to close the interceptor valve in the event of sudden drop in load to avoid increase in speed sufficient to operate the emergency or autostop governor.

The foregoing and other objects are effected by the invention as will be apparent from the following description and claims taken in connection with the accompanying drawings, forming a part of this application, in which:

Fig. 3 is a sectional detail view showing a throttle valve operating mechanism; and Fig. 4 is a diagram showing governor relations with respect to speed and load.

Figure 1:
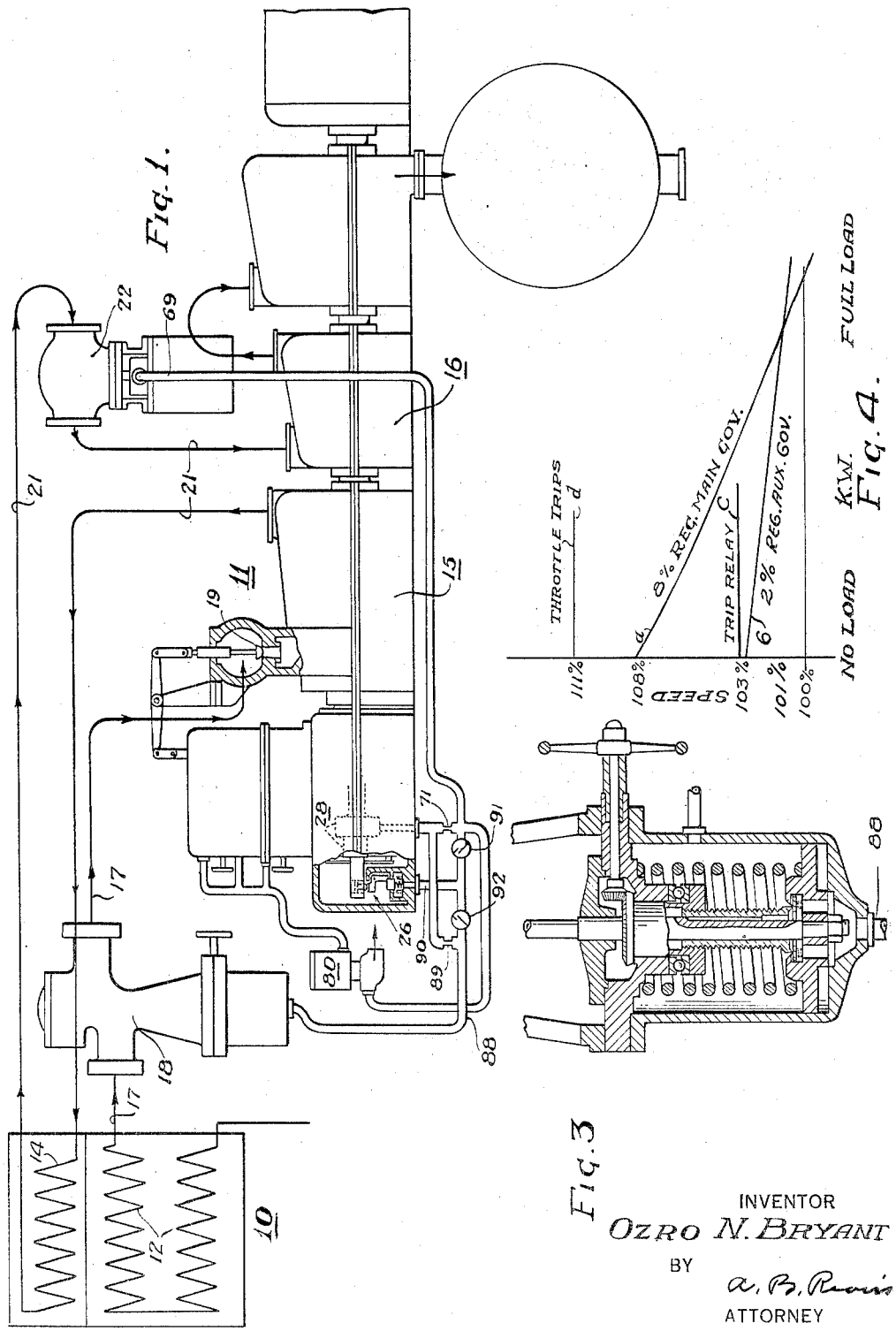
Fig. 1 is a diagrammatic view of a boiler and reheat turbine installation.
Figure 2:
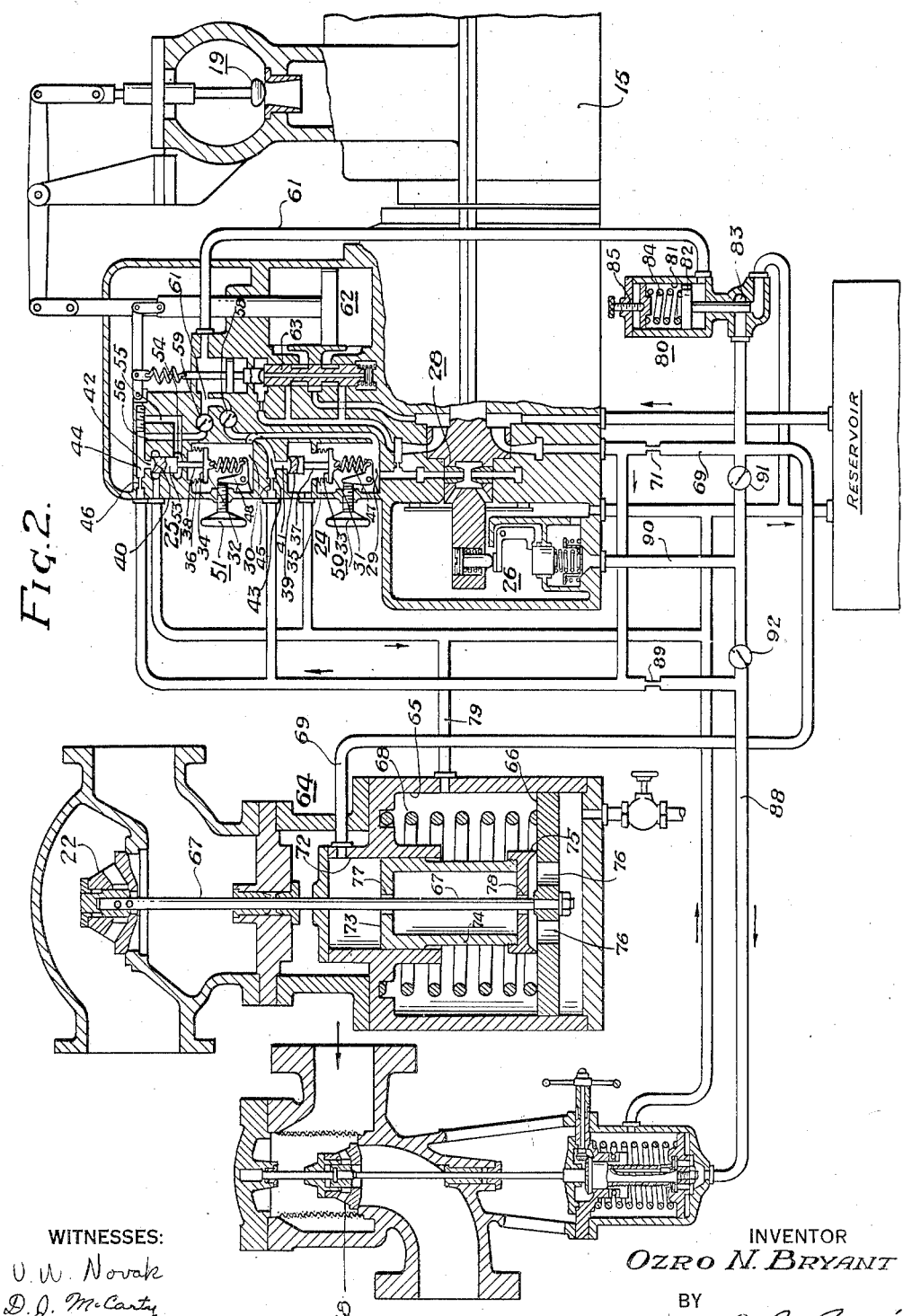
Fig. 2 is a sectional view of the turbine control mechanism, including the main and auxiliary governors and the throttle, admission and intercepting valves.

In the drawings there are shown a boiler installation, at 10, and a turbine installation, at 11.

The boiler installation includes a superheater 12 and a reheater 14.

The turbine installation comprises a first or high-pressure unit or section 15 and a second or intermediate-pressure section or unit 16.

A passage 17 delivers steam from the superheater to the high-pressure turbine section 15 and it includes a throttle valve 18 and a governor valve 19. A passage 21 conducts steam, exhausting from the high-pressure turbine section 15, through the reheater 14 to the intermediate-pressure turbine section 16, and an intercepting valve 22 is arranged between the reheater and the intermediate turbine section.

The governing or admission valve 19 and the interceptor valve 22 are operated in response to speed of the turbine installation. To this end, there are provided main and auxiliary governors, at 24, and, at 25, having force impressed thereon and varying substantially as the square of the speed and an autostop emergency governor, at 26, which is tripped upon attainment of a predetermined overspeed.

The main governor, at 24, is set for a normal speed and it operates to control the governing or admission valve 19. The auxiliary governor, at 25, is set for a slightly higher speed than the governor, at 24; and, because, as indicated in Fig. 4, the droop in speed for the auxiliary governor is less than that for the main governor, upon increase in speed of the installation to a predetermined small extent and within the governing range of the main governor, at 24, the latter is superseded by the auxiliary governor, at 25, not only to control the governing or admission valve but also, for slight increase in speed above that required to close the governor valve, to trip the intercepting valve 22 for closing.

Tripping of the autostop governor, at 26, brings about closing of the interceptor valve 22 and of the throttle valve 18.

The advantage of the auxiliary governor, at 25, is that it brings about rapid closing movement both of the governor and of the interceptor valves with only small increase in speed of the installation. For example, referring to Fig. 4, assuming that the main governor, at 24, has 8% regulation, that the auxiliary governor, at 25, has 2% regulation, secured by the hereinafter-described compensating feature, and that the speed changer of the auxiliary governor is set 1% higher than that of the main governor, then, upon the turbine speed reaching 101%, the auxiliary governor supersedes the main governor and closes the governor valve at 103% speed and, upon slight additional increase in speed, rapid closure of the intercepting valve 22 is initiated. Just as soon as the speed drops below 103%, opening of the intercepting valve begins. Therefore, the auxiliary governor, at 25, takes care of transient or sudden load drops which might otherwise result in increase in speed, particularly on account of trapped steam, to an extent sufficient for tripping by the autostop governor, in which event, time is required for resetting of the latter and for restoration of the installation to the line. Hence, the auxiliary governor, at 25, guards against operation of the autostop or emergency governor and inconvenience caused thereby except when required by emergency speed conditions.

As shown, the primary governing force or pressure is developed by the impeller 28 carried by the turbine shaft and developing pressure of oil varying substantially as the square of the speed. The impeller delivers oil under pressure to the chambers 29 and 30 of the main and auxiliary transformer governors, at 24, and, at 25, for action on the pressure areas 31 and 32 of the heads 33 and 34 of the bellows elements 35 and 36. The bellows heads have thrust engagement with the stems 37 and 38 of the cup valves 39 and 40 covering escape ports 41 and 42 of spaces or passages 43 and 44 supplied by orifices 45 and 46 from a suitable oil pressure source. Springs 47 and 48 exert forces on the heads 33 and 34 so that each of the transformer governors has an equilibrium position with the primary or impeller fluid pressure force exerted on the bellows head balanced by the forces of the spring and of the secondary or transformed oil pressure acting on the cup valve and tending to open it.

The transformer governors, at 24, and, at 25, are provided with speed changers 50 and 51 so that the main governor, at 24, may be set for a normal operating speed and the auxiliary governor, at 25, may be set for a slightly higher speed. Also, the governor, at 25, has a speed compensator to narrow its regulation so that the auxiliary governor valve may be fully closed at a speed which is only a small percentage above normal and so that, with only a slight further increase in speed, the intercepting valve may be closed.

The speed corrector or compensator is preferably of the type illustrated and described in my Patent No. 2,323,115 of June 29, 1943. It comprises a piston 53 connecting the cup valve 40 and the stem 38, the piston providing a pressure area 54 opposing that of the cup valve 40 and exposed to pressure of liquid supplied by the passage 55 from the viscous orifice device, at 56, whose inlet is in communication with the space or passage, at 44. The orifice device provides for a pressure at 55 which is always proportional to the pressure at 44 dependent on the length of the helical viscous flow passage between the passage, at 44, and the passage, at 55. In operation, the governor, at 25, responds instantly to change in load with change in speed and the application of a proportional change of pressure to area 54 is effective to reduce the speed change due to load change. Therefore, the auxiliarly governor, at 25, has, because of the compensating feature, a narrow percentage of regulation, and it is for this reason that it is capable, after superseding the main governor, at 24, of closing the governor valve upon a small percentage of increase in speed above normal and then, upon a slight additional increase in speed, to trip the interceptor valve for closing, whereby the governor and interceptor valves are controlled to prevent, pursuant to drop in load, overspeeding of the turbine installation sufficient to operate the autostop governor.

Superseding of the main transformer governor, at 24, by the auxiliary transformer governor, at 25, is effected by means of check valves 58 and 59 through which communication takes place with the control pressure passage or space 61 in which change in pressure is effective to operate the governor or admission valve 19 and to trip the interceptor valve 22 for closing movement. It will be apparent that the check valves provide for the maintenance of pressure in the space 61 which is the higher of the transformed pressures developed by the main and auxiliarly governors, at 24, and, at 25. Therefore, when the turbine speed increases slightly above normal, for example, to 101%, the auxiliarly governor, at 25, takes over control of the admission valve. As the regulation of the latter governor is small, further small increase in speed, for example, to 103%, suffices to close the governor valve 19 and a slight additional increase in speed trips the interceptor valve 22 for closing.

The governor valve 19 is of a conventional type and it is operated by the usual servo-motor, at 62, having a relay 63 operative in response to pressure in the control line or space 61.

The interceptor valve is opened and closed by means of any suitable servo-motor or operating device, for example, the servo-motor, at 64, including a cylinder 65, a piston 66 in the cylinder connected by means including its rod 67 to the valve, and a spring 68 exerting force on the piston 66 to close the valve. The intercepting valve 22 is opened by fluid under pressure supplied to the cylinder 65 and acting on the piston 66 against the spring 68. Fluid pressure for this purpose is provided in the space or passage 69 supplied through an orifice 71 from any suitable pressure source.

The space or passage 69 communicates with the cylinder 72 unitary and coaxial with the cylinder 65 and having a piston 73 therein. A hollow stem 74 depends from the piston 73, encompasses the rod 67, and is provided with a cup valve 75 at its lower end, the cup valve being in covering relation with respect to the ports 76 formed in the piston 66.

Increase in pressure in the cylinder 72 is effective to restrict the escape of liquid through the ports 76 from below the piston 66, in consequence of which the fluid pressure builds up below such piston and opens the intercepting valve.

Preferably, the piston 73 and the cup valve 75 define annular orifices 77 and 78 with respect to the rod to assure, with flow, of higher pressure tending to restrict the escape of liquid from below the piston than that tending to open the cup valve to provide for such escape. On the other hand, with decline in pressure in the space 69 and the cylinder 72, the spring 68 is effective to move the piston 66 downwardly, the pressure of liquid below the piston acting against the cup valve to open the latter, whereby liquid is permitted to escape to the space above the piston for discharge through the drain connection 79.

From the structure described, it will be apparent that drop in pressure in the space 69 renders the spring 68 effective to close the intercepting valve 22 wholly or partially. Therefore, when the pressure reaches a value corresponding to slightly more than 103% speed, the trip relay, at 80, is operated to release the pressure in the interceptor valve operating device pressure space. Also, the autostop governor operates to release such pressure.

The trip relay, at 80, is preferably comprised by a cylinder 81, a piston 82 in the cylinder connected to the valve 83, and a spring 84 exerting force on the piston to close the valve. As the passage 61 supplies liquid under control pressure to the cylinder for action on the piston 81 against the spring 84, it will be apparent that the latter may be set, for example, by the screw 85, for opening of the valve 83 when the control pressure reaches a value slightly in excess of that required for closing the governor or admission valve, whereupon the pressure in the space 69 is tripped or released and the spring 68 rapidly closes the interceptor valve 22.

In the event of overspeeding of the installation to the extent of about 10%, the autostop governor, at 26, is tripped to relieve suddenly the pressure in the space or passage 69, whereupon the interceptor valve rapidly closes. Also, operation of the autostop governor is effective to relieve the pressure in space 88, supplied by the orifice 89, for rapid closing of the throttle valve 18 so that, in the event of an emergency condition, both the throttle and interceptor valves are closed.

To provide for closing only of the interceptor valve in response to governor pressure and for closing of both the throttle and interceptor valves in response to autostop governor operation, the autostop line 90 is connected, through check valves 91 and 92, to the spaces 69 and 88 and which check valves are arranged to open to drop the pressure in both spaces when the pressure in line 90 is dumped by opening of the autostop valve.

The relative operations will be clearer from a consideration of Fig. 4, relating speed or cycles to load. In this view, lines $a$ and $b$ represent speed droop from no load to full load for the main and auxiliary governors; line $c$ represents speed for operation of trip relay 80; and line $d$ indicates speed for throttle valve tripping in response to emergency or autostop governor operation.

From the foregoing, it will be apparent that I have provided admission and interceptor valves for a reheat turbine installation with the admission valve controlled by a main governor for normal speed operation together with an auxiliary governor having a slightly higher speed setting than the main governor and arranged, upon slight increase in speed above normal, to supersede the latter so that, with a small further increase in speed, the governor valve may be closed; and, with a slight additional increase in speed, the relay, at 80, may be tripped to bring about rapid closing of the interceptor valve. The autostop governor not only closes the throttle valve but also the interceptor valve. The auxiliary governor, therefore, operates to keep the reheat turbine installation under control with load drops which might otherwise result in operation of the autostop governor with the inherent inconvenience of the latter so far as restoring the installation to the line is concerned.

While the invention has been shown in but one form, it will be obvious to those skilled in the art that it is not so limited, but is susceptible of various changes and modifications without departing from the spirit thereof.

What is claimed is:

1. In a turbine installation wherein superheated steam is supplied to a first turbine section and the steam discharging from the latter is reheated and then supplied to a second turbine section, the combination of, a governor valve in the supply connection of the first turbine section; an interceptor valve in the supply connection of the second turbine section; apparatus for operating the interceptor valve and including means for normally holding it open; main and auxiliary governors for operating said governor valve and driven by the turbine; said auxiliary governor having a smaller percentage of regulation than the main governor; speed changers for the governors providing for settings of the latter such that the main governor normally controls the governor valve, and, when the rated speed is exceeded by a predetermined small amount, the auxiliary governor supersedes the main governor and closes the admission valve; and means responsive to the auxiliary governor, upon a predetermined small amount of increase in turbine speed beyond that required for the auxiliary governor to close the governor valve, to release said holding means for operation of said apparatus to move the interceptor valve in a closing direction.

2. In a turbine installation wherein superheated steam is supplied to a first turbine section and the steam discharging from the latter is reheated and then supplied to a second turbine section, the combination of, an admission valve in the supply connection of the first turbine section; an interceptor valve in the supply connection of the second turbine section; a spring for biasing the interceptor valve in a closing direction; means for holding the interceptor valve open against said spring; main and auxiliary governors driven by the turbine for controlling the governor valve; means cooperating with the auxiliary governor so that it has a smaller percentage of regulation than the main governor; speed changers for the governors and providing for settings of the latter such that the main governor normally controls the governor valve and, when the rated speed is exceeded by a predetermined small amount, the auxiliary governor supersedes the main governor and closes the governor valve; and means responsive to the auxiliary governor, upon a predetermined small amount of increase in turbine speed beyond that required for the auxiliary governor to close the governor valve, to release said holding means for the interceptor valve to render its spring effective to move the interceptor valve in a closing direction.

3. In a turbine installation wherein superheated steam is supplied to a first turbine section and the steam discharged from the latter is reheated and then supplied to a second turbine section, the combination of throttle and admission valves in the supply connection of the first turbine section; an interceptor valve in the supply connection of the second turbine section; springs for biasing the throttle and interceptor valves in closing directions; means for holding the throttle and interceptor valves open against said springs; main and auxiliary governors driven by the turbine for controlling the governor valve; an emergency governor driven by the turbine and operative in response to a predetermined overspeed of the latter; means cooperating with the auxiliary governor so that it has a smaller percentage of regulation than the main governor;

speed changers for the main and auxiliary governors and providing for settings thereof such that the main governor normally controls the governor valve and, when the rated speed is exceeded by a predetermined small amount the auxiliary governor supersedes the main governor and closes the governor valve; means responsive to the auxiliary governor, upon a predetermined small amount of increase in turbine speed beyond that required for the auxiliary governor to close the governor valve, to release said holding means for the interceptor valve to render its spring effective to move the interceptor valve in a closing direction; and means responsive to operation of the emergency governor to release said holding means for both the interceptor and throttle valves to render the springs thereof effective to close them.

4. In a turbine installation wherein superheated steam is supplied to a first turbine section and the steam discharging from the latter is reheated and then supplied to a second turbine section, the combination of, throttle and admission valves in the supply connection of the first turbine section; an interceptor valve in the supply connection of the second turbine section; means providing first and second fluid pressures and including normally-closed relief and relay-operated valves; means operative to close the throttle and interceptor valves and subject to said first and second fluid pressures to hold the valves open; an emergency governor responsive to a predetermined turbine overspeed to trip open said relief valve to reduce the first and second fluid pressures for closing of the throttle and interceptor valves; pressure-responsive means for varying the admission valve position; main and auxiliary governors responsive to turbine speed; relays moved by the respective main and auxiliary governors to provide fluid control pressures; means providing for imposition on said pressure-responsive means of the higher of the main and auxiliary governor control pressures; speed changers for the respective main and auxiliary governors and operative to adjust the speed ranges of the latter relatively; a compensator for the auxiliary governor operative to narrow the speed range thereof so that its control pressure increases more rapidly in relation to turbine speed than that of the main governor, whereby, with the auxiliary governor speed changer set for a higher speed range than that of the main governor, the auxiliary governor may take over control of the admission valve at a turbine speed slightly higher than normal for the main governor and close such valve at a lower speed than it would be closed by the main governor control pressure; and a relay responsive to auxiliary governor control pressure, upon the latter exceeding a value sufficient to close the admission valve, to open the relay-operated valve to reduce said second fluid pressure to render said closing means for the interceptor valve operative to interrupt the supply of the steam to the second turbine section.

5. In a turbine installation wherein superheated steam is supplied to a first turbine section and steam discharging from the latter is reheated and then supplied to the second turbine section, the combination of, an admission valve in the supply connection for the first turbine section; an interceptor valve in the supply connection for the second turbine section; a servo-motor for operating the admission valve; an operating device for the interceptor valve and including a spring and means for holding the valve open against the force of the spring; first means responsive to turbine speed for controlling the servo-motor; second means responsive to turbine speed a small amount in excess of normal operating speed thereof to supersede the first speed-responsive means in control of the servo-motor and having a small speed droop so that, for further increase in speed of a narrow range, the servo-motor is operated to close the admission valve; and means responsive to additional increase in turbine speed, above that required for the second speed-responsive means to operate the servo-motor to close the admission valve, to relieve the means of the operating device holding the interceptor valve open so that the spring of such operating device is rendered effective to close the interceptor valve.

6. The combination as claimed in claim 5 with third means responsive to a predetermined turbine overspeed to render the operating device effective to close the interceptor valve.

7. The combination as claimed in claim 5 with a throttle valve in the supply connection for the first turbine section and with an emergency governor responsive to a predetermined turbine overspeed to close the open throttle valve and to render the operating device effective to close the interceptor valve.

OZRO N. BRYANT.

No references cited.